United States Patent [19]

Ganesan et al.

[11] Patent Number: 5,781,538
[45] Date of Patent: Jul. 14, 1998

[54] SUBSCRIBER UNIT IN A WIRELESS PERSONAL COMMUNICATION SYSTEM

[75] Inventors: Kalyan Ganesan, Germantown; Ranjan Pant; Victor Liau, both of Gaithersburg; Tayyab Khan, Germantown; Desmond Coughlin, Ijamsville, all of Md.; Harry Johnson, Springfield, Va.

[73] Assignee: Hughes Electronics Corporation, El Segundo, Calif.

[21] Appl. No.: 482,273

[22] Filed: Jun. 7, 1995

Related U.S. Application Data

[63] Continuation-in-part of Ser. No. 344,272, Nov. 23, 1994.
[51] Int. Cl.[6] .................................................. H04J 3/00
[52] U.S. Cl. ........................... 370/310; 455/86; 455/575
[58] Field of Search .................................. 370/313, 345, 370/314, 315, 316, 317, 321, 337, 328, 347, 329, 330, 332, 334, 338; 455/31.1, 33.1, 34.2, 130, 150.1, 188.1, 190.1, 192.1, 192.2, 196.1, 255, 258, 259, 313, 314, 315, 318, 73, 84, 86, 575; 379/58, 59

[56] References Cited

U.S. PATENT DOCUMENTS

| 5,020,093 | 5/1991 | Pireh | 379/59 |
| 5,170,492 | 12/1992 | Moller et al. | 455/76 |
| 5,428,613 | 6/1995 | Spiotta et al. | 370/458 |
| 5,444,745 | 8/1995 | Ali-Vehmas | 375/347 |
| 5,546,383 | 8/1996 | Cooley et al. | 370/330 |
| 5,592,480 | 1/1997 | Carney et al. | 370/347 |
| 5,612,703 | 3/1997 | Mallinckrodt | 342/457 |
| 5,615,261 | 3/1997 | Grube et al. | 380/2 |

FOREIGN PATENT DOCUMENTS

526285-A2  3/1993  European Pat. Off. ......... H04H 1/02

Primary Examiner—Alpus H. Hsu
Assistant Examiner—Kwang B. Yao
Attorney, Agent, or Firm—John Whelan; Michael Sales

[57] ABSTRACT

The present invention relates to a subscriber unit in a wireless personal communications system (WPCS). In one embodiment, the subscriber unit includes a digital dataport for modemless communication of digital signals. Another preferred embodiment provides for a subscriber unit having a cable television transport module for modulating and demodulating signals over unused bandwidth available on cable television lines.

15 Claims, 8 Drawing Sheets

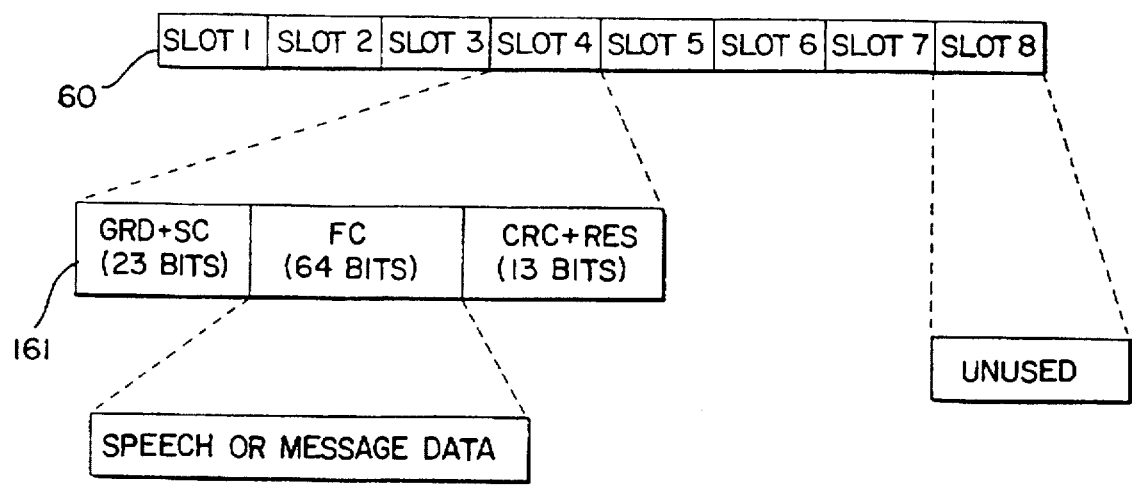
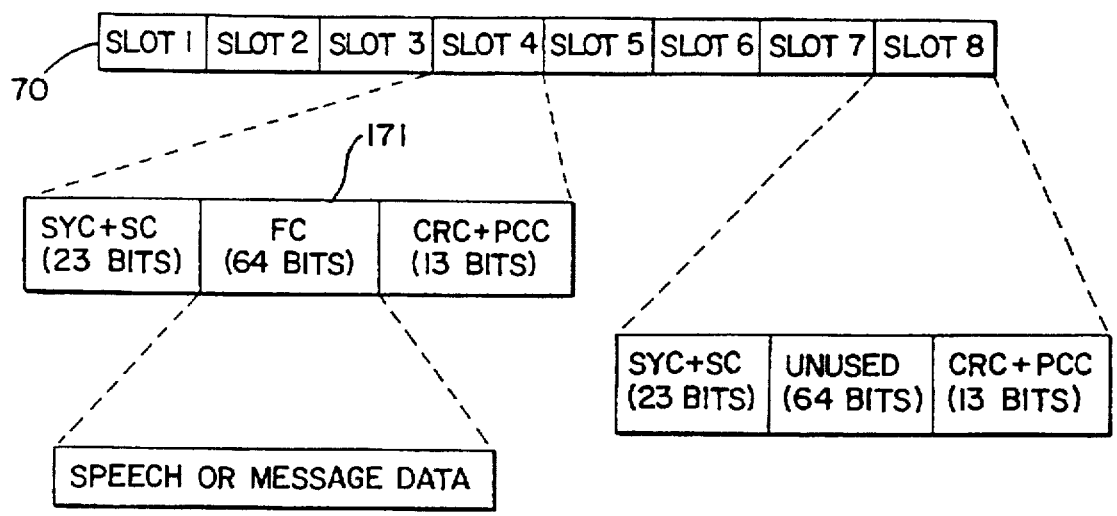

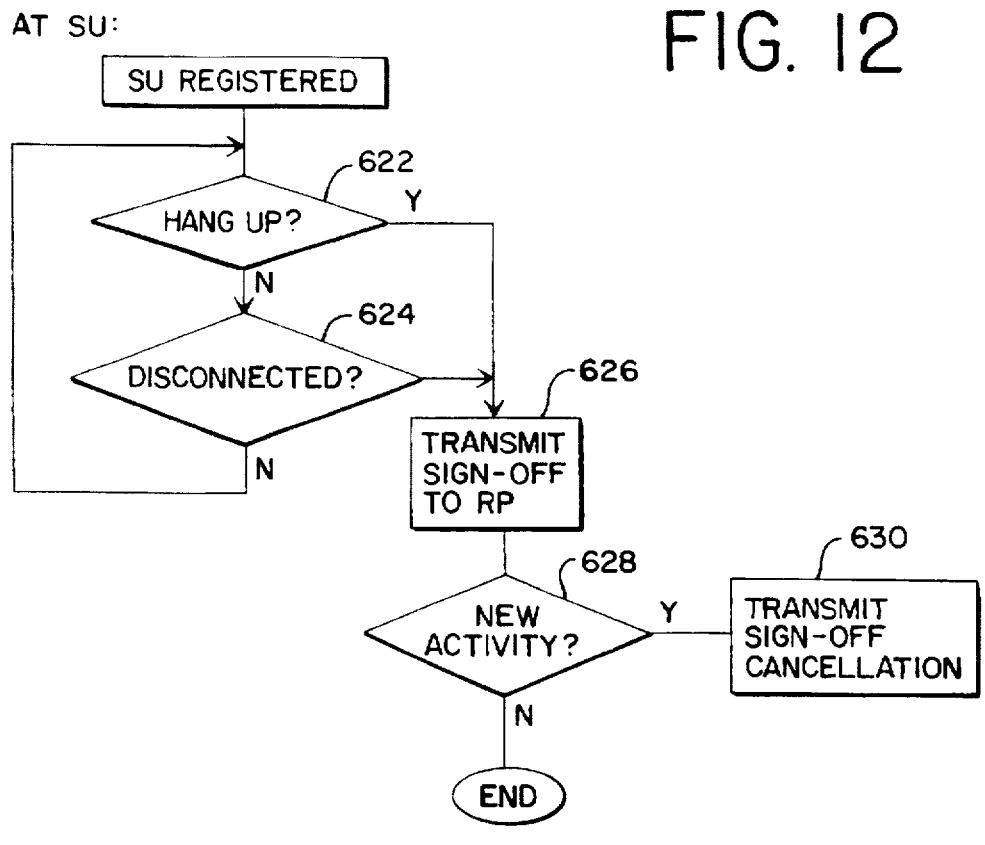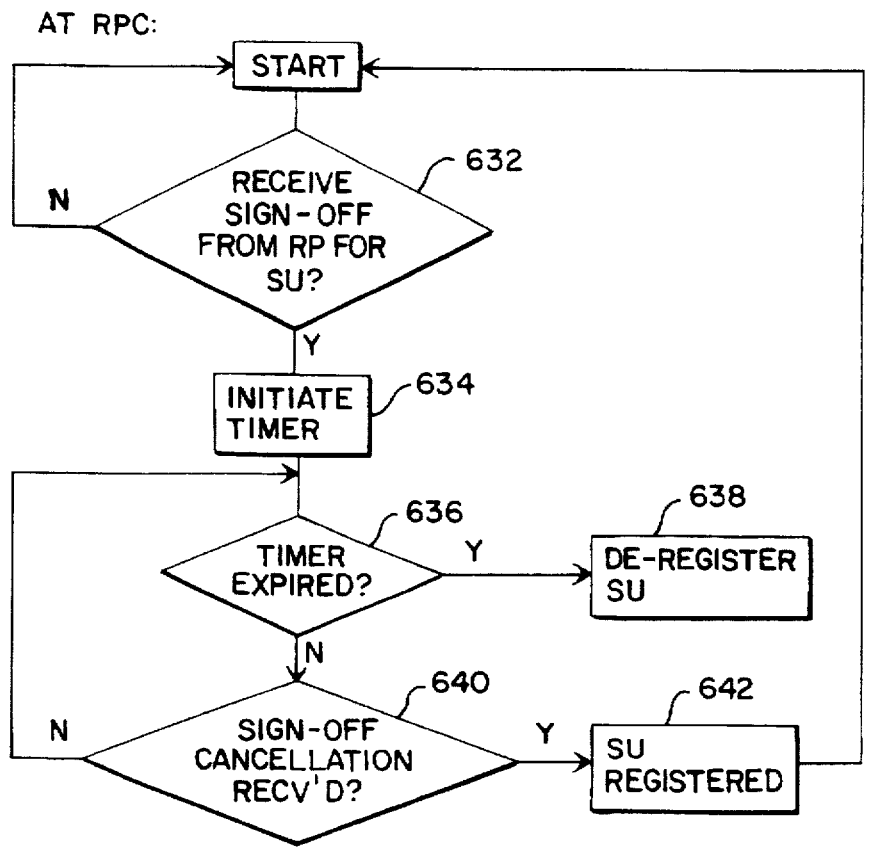
FIG. 12

SUBSCRIBER UNIT IN A WIRELESS PERSONAL COMMUNICATION SYSTEM

CROSS-REFERENCES TO RELATED APPLICATIONS

The present application is a continuation-in-part of application ser. No. 08/344,272, filed Nov. 23, 1994, entitled "Wireless Personal Communication System," by inventors K. Ganesan, et.al., currently pending (attorney docket number PD-N94022). The above identified application in its entirety is incorporated herein by reference.

BACKGROUND OF THE INVENTION

Wireless access communications systems (WACS) and personal access communications systems (PACS) strive to provide flexible communication services in a wireless fashion. WACS and PACS, in personal communication services (PCS) environments may provide a system for improving or eliminating drop wire requirements to homes and businesses. Radio transmitters are the vehicle for eliminating the need for wiring.

While cellular telephones and cordless telephones also provide some wireless features, certain limitations are inherent in each of these systems. Cellular telephones transmit signals to cellular base stations at relatively high power levels. The high power levels require Federal Communications Commission (FCC) approval and careful frequency planning to avoid unwanted interference. Additionally, the cellular base stations tend to be complicated and expensive units. Cordless residential telephones are lower power devices, but the frequencies are usually prone to interference. Also, cordless phones require wire connections to the public telephone lines and cannot communicate with wireless access communication PCS systems. Furthermore, cellular phones and cordless phones are generally not capable of supporting both digital voice and digital data transmissions.

A typical architecture for a wireless PCS system includes subscriber units (SUs), radio ports (RPs), one or more radio port controllers (RPCs), and an access manager (AM). The SUs transmit information to the RPs using radio frequencies. RPs are small devices typically mounted to existing utility poles. The RPs are connected to an RPC using wireline facilities. Each RPC is connected to a switch that is part of the public switched telephone network (PSTN) and the AM. The AM provides overall coordination of the call handoff across RPCs, provides for mobility management, and supports subscriber related features including registration and authentication.

A consortium of telecommunication entities has recently developed a proposed standard for providing WACS PCS. This standard outlines the above-mentioned architecture. Further details concerning this proposed standard are set out in Bellcore Corp. publication TR-INS-001313 entitled Generic Criteria for Version 0.1 Wireless Access Communications Systems (WACS) published October 1993 (herein sometimes referred to as the specification). The publication is available to those interested in WACS PCS from Bellcore Corp. at Bellcore, Customer Services, 8 Corporate Place— Room 3C-183, Piscataway, N.J. 08854-4156, or at 1(800) 521-CORP. Also, the reader may refer to Bellcore manual SR-ARH-002315 describing specific modulator and demodulator requirements in the SU and the RP. Additionally, the U.S. Telecommunications Industry Association (TIA) has recently approved a PACS standard as set forth in TIA publication JTC(AIR)/95.4.20-033R2. The reader is presumed to be familiar with the specification and with related technological issues known to those having ordinary skill in the art.

Although general standards have been set forth, advances and improvements to the technology have been discovered including implementation of novel configurations and circuitry. In the configuration of the general WACS standard, SUs, whether portable or fixed, receive analog voice signals such as those spoken into a telephone handset. The SUs typically convert the analog voice signal to a digital signal and compress the digital signal. The SU then transmits the compressed signal over a radio link to an RP. The RP forwards the signal to an RPC over wireline facility.

Signals received by an RP from an RPC intended for a particular SU are transmitted by the RP, received by the SU, decompressed and converted to an analog signal to drive e.g. an earpiece. Although this architecture provides a functioning WACS PCS, it does not account for optimization of electronic hardware to perform the necessary signal processing. Also, this architecture does not cover system configurations that improve signal routing and decrease hardware requirements when specific applications arise. Furthermore, only fixed or limited mobility use is contemplated in the existing proposed standard.

Accordingly, a WACS or PACS PCS system is desirable that will operate in low power applications, support voice and data communications, and communicate with other WACS PCS systems. Optimized hardware and flexible system configurations are also desirable in a WACS or PACS PCS system, including systems which minimize or eliminate the need for transmission over tariff lines such as PSTN or other commercial signal carriers.

It would also be desirable if an SU could transmit and receive both voice and data information, especially if the SU could transmit and receive the data without using a modem. Modemless data transmission over the same line used for voice communication would greatly reduce costs for the end user. Reduced costs include the cost of a separate phone line for data transmission and the costs associated with having a modem such as in a fax machine.

Another advantageous feature is a wireless personal communication system that provides data services substantially similar to those provided by traditional wireline systems. The system should transparently provide these services to subscribers. In addition, the wireless personal communication system should allow transmission of high speed data such as voice band data.

It would also be desirable for a PCS system to be flexible enough for use both in the United States and in other countries. Such a system would be readily adaptable to interwork with multiple communication protocols and would comply with each country's technical specification.

Another advantageous feature would be for the SU to be remotely activated by the wireless PCS system. Such remote activation would prevent fraudulent access and simplify the user registration process.

Another advantageous feature would be a PCS system that could use excess bandwidth in existing CATV cabling. Using existing cabling would reduce costs in providing PCS service and would allow cable operating companies to provide telephony service as well as cable programming.

SUMMARY OF THE INVENTION

According to a first aspect of the present invention, an SU is provided for use in a wireless communication system. The SU includes a plurality of antennas, an RF receive section having a diversity selection unit that receives input signals from each of the antennas, an RF transmit section generating an output signal for transmission over at least one of the antennas, a digital dataport for modemless digital communication, and a databus interconnecting the digital dataport with the RF receive and transmit sections. The SU may also include an analog port adapted for connection to an analog telephone line.

In another aspect of the present invention, the SU may include a pair of antennas mounted spatially and angularly diverse from each other, e.g., the second antenna may be at an opposite end of the SU and orthogonal (or otherwise non-parallel) to the first antenna.

In another preferred embodiment, the SU is a portable SU for use in a wireless personal communications system and may be used in a high mobility environment. A high mobility environment may include use of the portable SU while traveling at typical vehicular speeds, e.g. 55 M.P.H. Operating in a high mobility environment provides a seamless connection for the end user. For example, a user may originate a conversation on a portable SU at home, and continue the conversation while driving to and then arriving at work. Any handoff performed by an originating WACS PCS system to other systems, such as a second WACS PCS, cellular system, or other telecommunication system, will preferably be substantially transparent to the SU user.

A further embodiment of the present invention provides a method of maintaining user registration data in a wireless personal communications system including the steps of timing a period directly after an SU user hangs up, maintaining power to the SU and a connection between the SU and the personal communications system until the timer reaches a predetermined value, and shutting down the SU after the timer reaches the predetermined value. The method of maintaining user registration is preferably incorporated into a power saving standby mode in the SU. The standby mode periodically depowers the SU during times of limited message activity.

According to another aspect of the present invention, a method of increasing data throughput capability is provided. The method includes the step of informing the SU that a high data rate signal is to be sent. The SU then communicates this high bandwidth request to the system. An assignment of time slots is received at the SU and the SU proceeds to aggregate the assigned time slots by splitting up the information over the assigned time slots.

The invention itself, together with further attendant advantages, will best be understood by reference to the following detailed description, taken in conjunction with the accompanying drawings.

BRIEF DESCRIPTION OF THE DRAWINGS

FIG. 6 is an illustration of a message format sent by the SU of FIG. 2.

FIG. 7 is an illustration of a message format sent by a RP to an SU.

FIG. 12 is a flow chart illustrating an alternative embodiment of a method of maintaining SU registration in a PCS system.

DETAILED DESCRIPTION OF THE DRAWINGS

Figure 1:
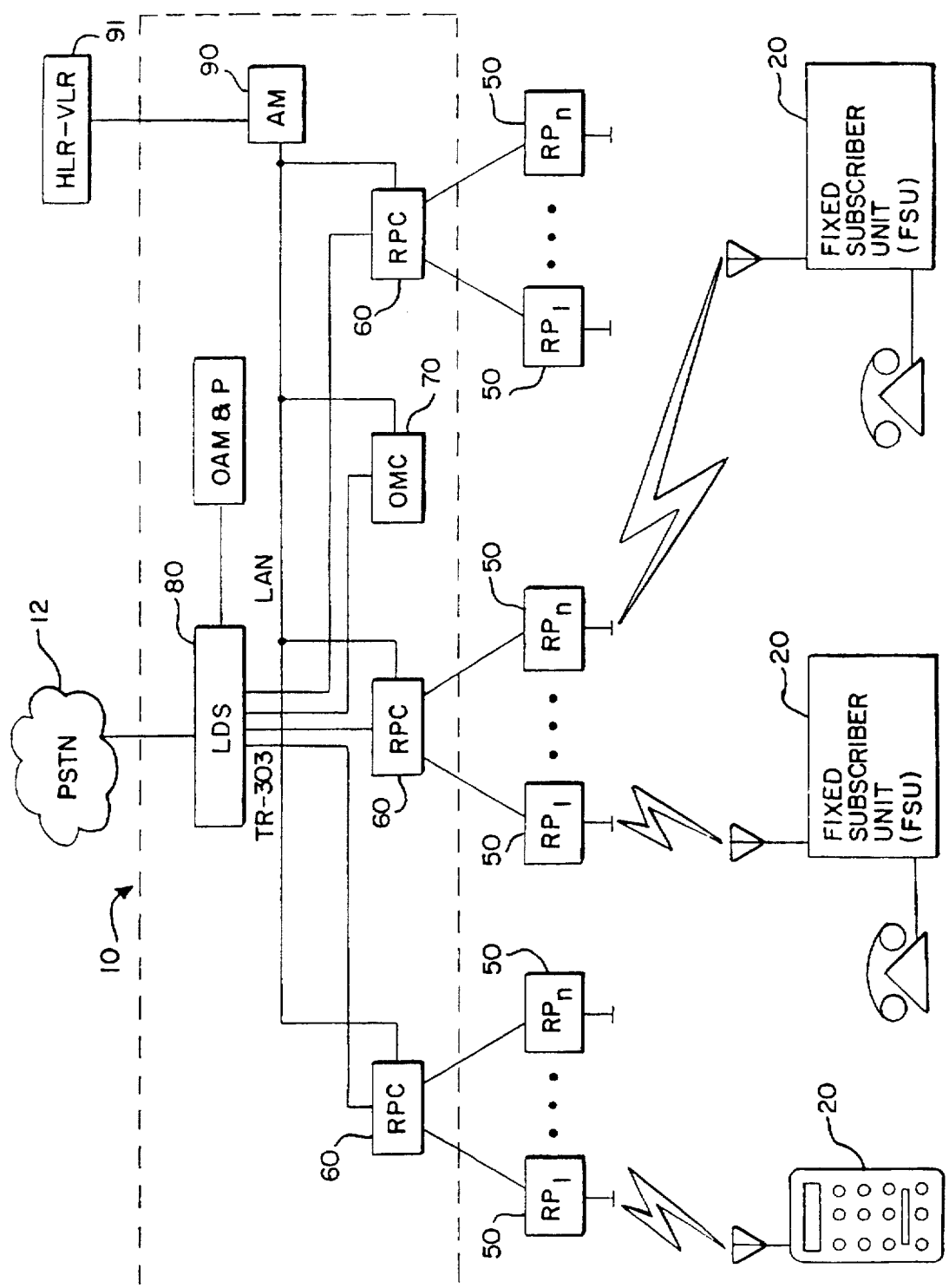
FIG. 1 is a block diagram of a wireless access communication system.

FIG. 1 illustrates a general block diagram of a wireless access communication system (WACS) 10. The WACS 10 includes subscriber units (SU) 20, radio ports (RP) 50, radio port control units (RPC) 60, an operations maintenance center (OMC) 70, a local digital switch 80, and an access manager (AM) 90. The SU 20 communicates with the radio port 50 via radio links. Each RP 50 communicates with an RPC 60 via transmission lines, typically standard T1 lines. The RPC 60 controls radio links and transmission lines carrying various voice and data communications. The switch 80 controls access between wireless access communication systems (WACS) 10 and the public switch telephone network (PSTN) 12. The AM 90 provides call control, communicates with the switch 80 to provide voice paths between the WACS network and the PSTN, and connects to a home location register-visitor location register (HLR-VLR) 91. Additional details are known to those skilled in the art and are set forth in the Bellcore specification. Recently, a newer proposed standard, personal access communications (PACS), has been introduced. Both WACS and PACS standards, however, may be implemented on the system described below.

The SU 20 may be either a fixed subscriber unit or a portable subscriber unit. A fixed subscriber unit may be connected to an analog telephone by standard two (or more) wire analog telephone lines using an RJ11 or similar interface. The SU 20, fixed or portable, provides voice and data quality comparable to a wired system. A portable subscriber unit is similar to the fixed subscriber unit 20 but also includes a mouthpiece, an earpiece, and a user interface keypad. The portable subscriber unit 20, in one embodiment is similar to a cellular phone. In another embodiment, the portable SU 20 is functionally similar to a cordless phone. Unlike many cordless and cellular phones, however, the portable SU 20 digitally processes and filters all voice signals prior to broadcasting. Subscriber units 20 provide wireless access for both voice and data information. Unless otherwise indicated, the term subscriber unit (SU) applies to both the fixed and the portable versions in the following descriptions.

An SU 20 may be located in the home or the office. Multiple SUs 20 may be in range of a single RP 50 and may be in broadcast range of each other. One embodiment of the present invention includes SUs 20 capable of directly communicating with each other in an intercom-like or walkie-talkie system. Another embodiment provides SUs 20 that can communicate with each other through a common RP 50 configured with a call switching capability. Thus, SU 20 to SU 20 calls may be made without routing through the RPC 60 or other components of the system. Alternatively, calls between SUs 20 may be switched through an RPC without performing any compression processing.

Another feature of the SU 20 is a distinctive ring capability which may provide individual annunciation or pager functions. In this embodiment, a group of SUs 20 in a home or office environment are assigned the same phone number identifier. Each SU 20 programmed to this phone number can be individually accessed. Individual access may be accomplished by adding a suffix code to the telephone number. The suffix code may cause only one of the SUs 20 to ring or all of the SUs to ring with an identifying tone specific to one user. Alternatively, a single phone line may be assigned to multiple telephone numbers. Each telephone number is then directed to a specific SU on the phone line. SU user registration identification numbers may be associated with a specific phone number so that only the desired SU rings.

Figure 2:
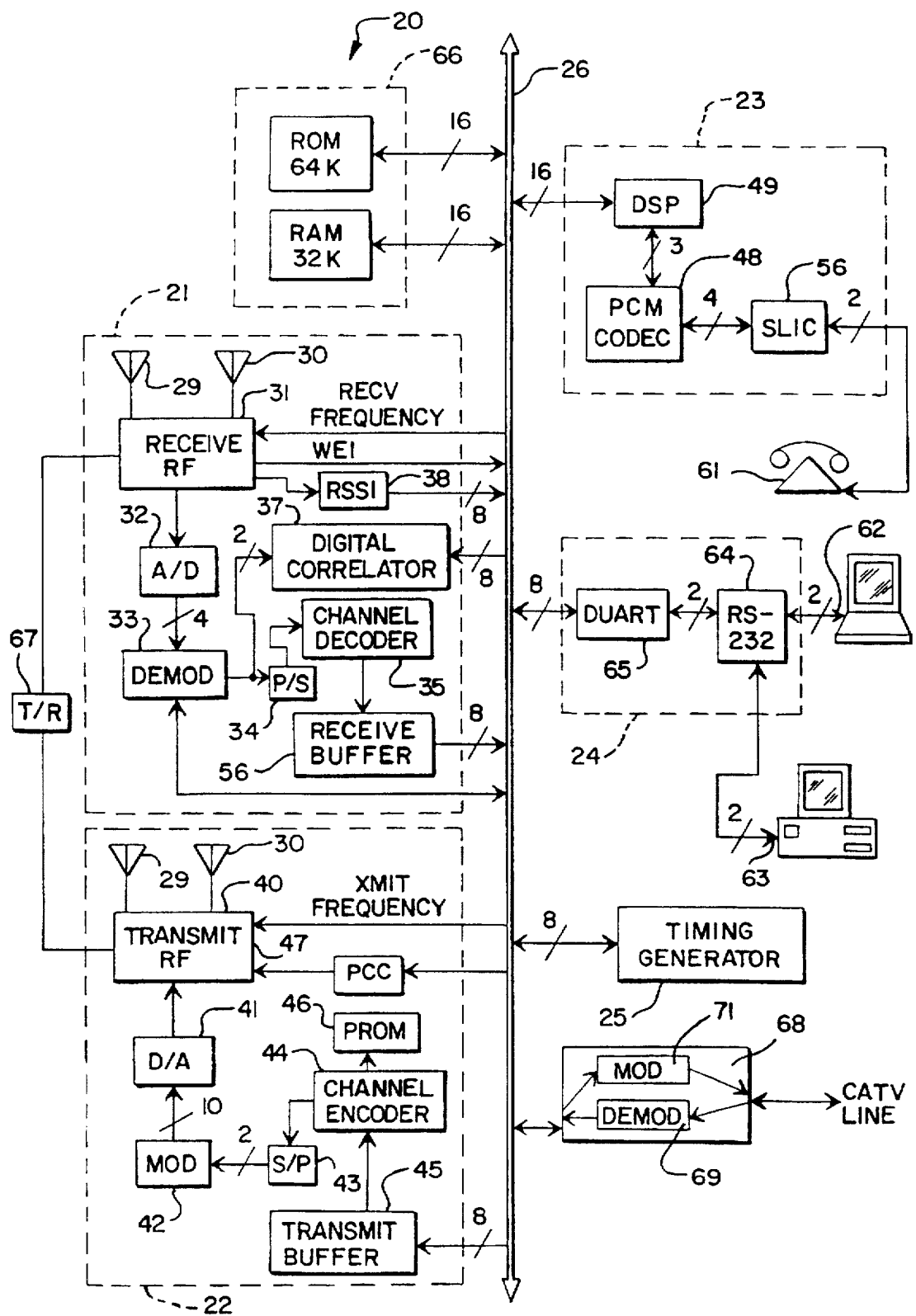
FIG. 2 is a block diagram of a presently preferred embodiment of an SU according to the present invention.

Referring to FIG. 2, a preferred implementation of an SU 20 is shown in greater detail. The SU 20 has five connections to the outside environment: an RF receive antenna 30, an RF transmit antenna 29, a telephone connection 61, a data port 62, and a debug port 63. Internally, the subscriber SU 20 comprises an RF receive section 21, an RF transmit section 22, an analog port 23, a digital dataport 24, a timing generator 25, a memory section 66, and a databus 26 connecting all the internal blocks together. In another preferred embodiment, the SU contains a cable transport module 68 connected to the databus 26 for interfacing voice/data signals from the databus to a CATV line. The module 68 contains a modulator 71 and a demodulator 69 for modulating and demodulating signals onto a cable television system.

The RF receive section 21 receives an RF input signal from the antenna 30. In the RF section 21, voice information is extracted from the RF signal in the form of a 32 kilobit per second (kbps) ADPCM signal. Data information may be received in ADPCM or PCM formats. The RF section 21 also demodulates correlation information in the RF input signal.

Figure 3:
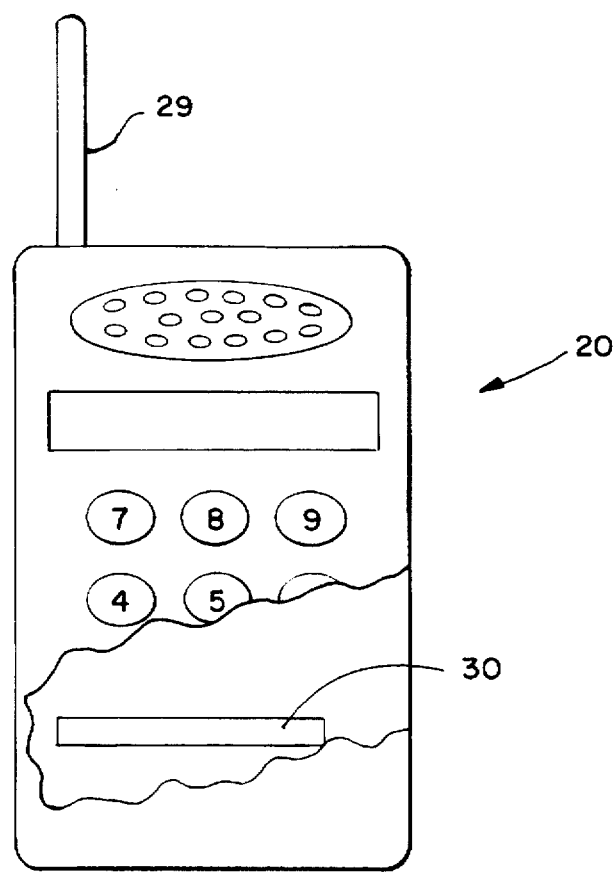
FIG. 3 is a fragmentary view of a preferred SU showing antenna placement.

As shown in FIG. 2, there appears to be two antennas 29, 30 connected to the receive section 21. The SU may also transmit on either antenna. A transmit/receive switch 67 is coupled to both antennas 29, 30 and to the RF receive and transmit sections 21, 22. In one embodiment, the antennas 29, 30 are positioned apart from one another to provide spatial diversity and improve reception/transmission quality. As best shown in FIG. 3, the antennas 29, 30 may also be mounted angularly diverse from one another. In another preferred embodiment, the diversity selection unit receives input signals from each of a plurality of antennas connected to the SU 20. The received information, whether voice or data, is then placed on the databus 26.

The RF transmit section 22 receives voice or data information from the databus 26 and generates an output signal containing the voice or data information for transmission over at least one antenna. Voice information is compressed to 32 kbps ADPCM and data information is simply modulated onto RF signals for transmission. In another embodiment the SU 20 may transmit or receive from another SU 20 directly.

The analog port 23 receives analog information such as from an analog telephone and converts it to digital 32 kbps ADPCM for further processing and transmission over a radio link. Voice information arriving from the databus 26 in 32 kbps ADPCM form is converted to an analog signal and is communicated to a telephone connected to the port 23. The digital port 24 manages data signals sent to and from both the debug port 63 and the data port 62. The digital port 24 permits modemless transmission and reception of digital signals at the SU 20. The databus 26 is a data line connecting the various internal functions of the SU 20. Preferably, the databus 26 is a 16-bit wide communication line.

In a preferred embodiment, a standard two wire loop connects the analog port 23 to a standard analog telephone. Analog voice signals picked up at the handset of the telephone will be converted in a subscriber line interface chip (SLIC) 56 from the two wire signal to a four wire signal. The four wire format voice signals are sampled and coded into a 64 kilobit per second mu-law pulse code modulated (PCM) signal by a PCM codec 48 in the SU 20. The digital signal is then processed in the digital signal processor (DSP) 49 which compresses the PCM signal into a 32 kbps ADPCM signal.

In a portable SU the SLIC 56 is unnecessary because the voice signals are received from a mouthpiece attached to the portable SU. In one preferred embodiment the same circuit board may be used for either portable or fixed applications. A switch or jumper may be used on the circuit board to designate the board's application. Alternatively, the board may be loaded without the SLIC 56 when a portable SU is desired. The universality of the circuit board design allows for cost savings to consumers and system operators.

In either type of SU, the DSP 49 sends the ADPCM signal along a databus 26 to the RF transmit section 22 where it enters a transmit buffer 45. The digital signal is temporarily stored in the transmit buffer 45 and then is transferred to the channel encoder 44. The channel encoder 44 encodes the digital signal with synchronization information in accordance with instructions stored in a programmable read only memory (PROM) 46 integrated circuit. The program stored in the PROM 46 is the decoding and encoding algorithm disclosed in the Bellcore specification which anyone of ordinary skill in the art may program in to a PROM or other memory device. The encoded digital signal is transported through a serial-to-parallel (S/P) converter 43 to a modulator 42. The encoded signal is then converted from digital to analog in a digital-to-analog (D/A) converter 41 and transmitted from the transmit RF section 40 by an RF antenna 29.

Digital data signals originating at the digital input port 24 follow a different path. Initially, the signal coming in at a digital port 24 passes through an RS-232 connection 64 into a DUART device 65. The data information signal, unlike a voice signal, is not compressed into ADPCM format. The digital data signal is not processed in the PCM codec 48 or DSP 49. Instead, it proceeds along the same databus 26 as the voice signals and goes directly to the transmit buffer 45, the encoder 44 and then to the MOD 42 for modulation onto a carrier frequency.

After modulation, the signal (regardless of whether voice or data) is then converted to an RF signal approximately within the range of 1.8 to 2.2 GHz and transmitted from the RF transmit section 22 at an average power of approximately 10–20 milliwatts. The peak power transmitted is approximately 80–160 milliwatts.

In standard WACS PCS, the output power of the RF transmit section 22 is controlled by a power control channel (PCC). The PCC can control the output power in steps of 0.75 dB +/−0.25 dB steps, with the total adjustment range being approximately 30 dB. In a preferred embodiment, a power controller 47 in the RF transmit section 22 of the SU 20 translates the power control instructions originating from the RPC 30.

Signals received by the SU 20 from a WACS/PACS PCS system first arrive at the RF antennas 29, 30 and are processed through a receive RF unit 31. The received analog signals are converted to digital form in an analog-to-digital (A/D) converter 32 and then demodulated in a demodulator 33. The demodulated wave form is then passed through a parallel-to-serial (P/S) converter 34, decoded in a channel decoder 35, and passed through a receive buffer 36. As part of the demodulation and decoding of the signal, the signal is also passed through a digital correlator 37 to analyze timing synchronization. The decoded signal in the receive buffer 36 then passes on to the databus 26 to the appropriate analog or digital port 23, 24 as determined by the DSP 49. Suitable parts for the A/D and D/A converters 32, 41 are a CXD1175AM-T6 A/D converter and a CXD1171-T6 D/A converter available from Sony Corporation. The Demod and Mod 33, 42 are preferably components as described in the Bellcore specification.

Figure 4:
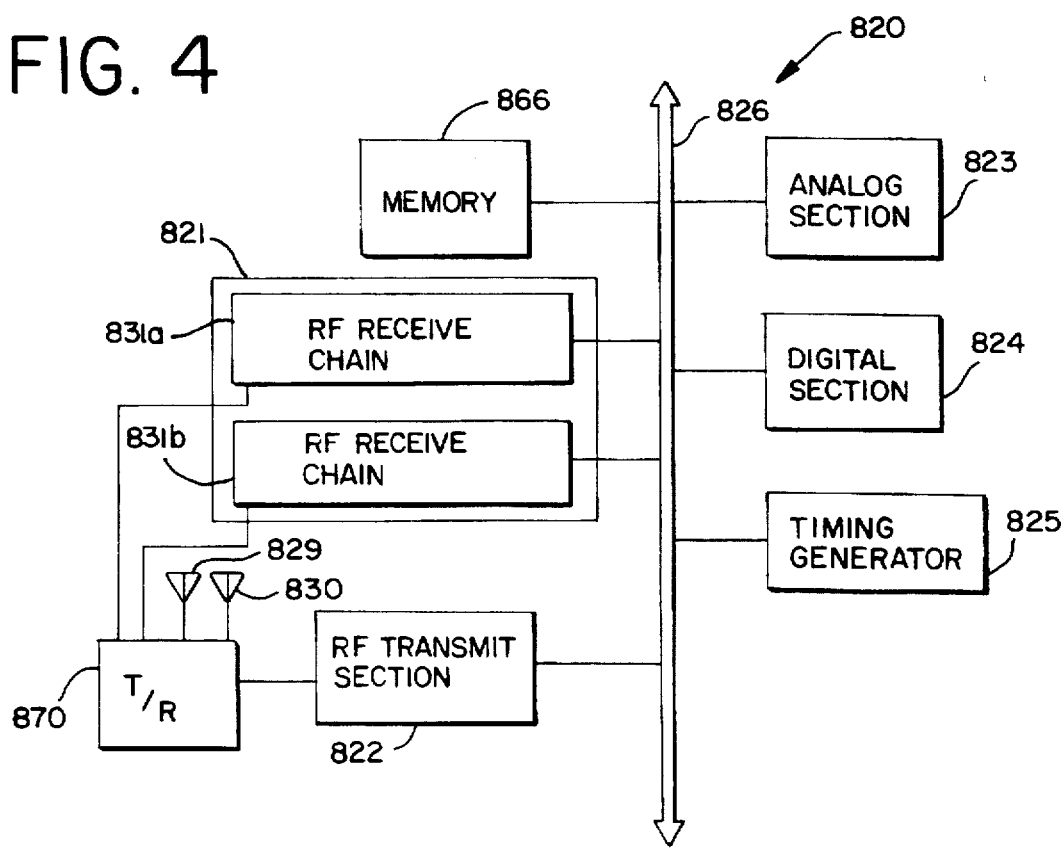
FIG. 4 is a block diagram of an alternative embodiment of the SU of FIG. 2.

Preferably, the portable SU 20 may be used in either low mobility, pedestrian environments or in higher mobility, automobile environments. In a high mobility environment, the RPC streamlines processing by sending some of the layer 2 messages from at least one of the DSPs in the STM instead of processing the message in the CAP. Also, referring to FIG. 4, the SU 820 may include an RF receive section 821 having a plurality of, and preferably two, RF receive chains 831a, 831b to provide high quality radio performance in a mobile environment. One of the receive chains 831a is dedicated to sweeping for optimal frequencies, and the other receive chain 831b communicates with the RP 50. The frequency sweep preferably searches for an available channel having the lowest signal-to-noise ratio.

In another preferred embodiment, the receive chains 831a, 831b can instantaneously sample the quality of the received signal from the two antennas 829, 830. The DSP in the analog section 823 selects the antenna that received the best signal to transmit on. After transmitting from the transmit section 822 through the chosen antenna, the transmitted signal is analyzed for errors at the RP 50 (FIG. 1). In a subsequent transmission from the RP, error information indicating whether any errors were received at the RP 50 is transmitted to the SU 820. Based on the error information received, the SU 820 will select the appropriate antenna 829, 830 in later transmissions. In the high mobility environment, this embodiment may offer higher quality communication capabilities over an SU having a single receive chain. A single receive chain, which would be taking measurements from the two antennas at different times, may be taking uncorrelated measurements and make selection of the best antenna arbitrary.

Figure 5:
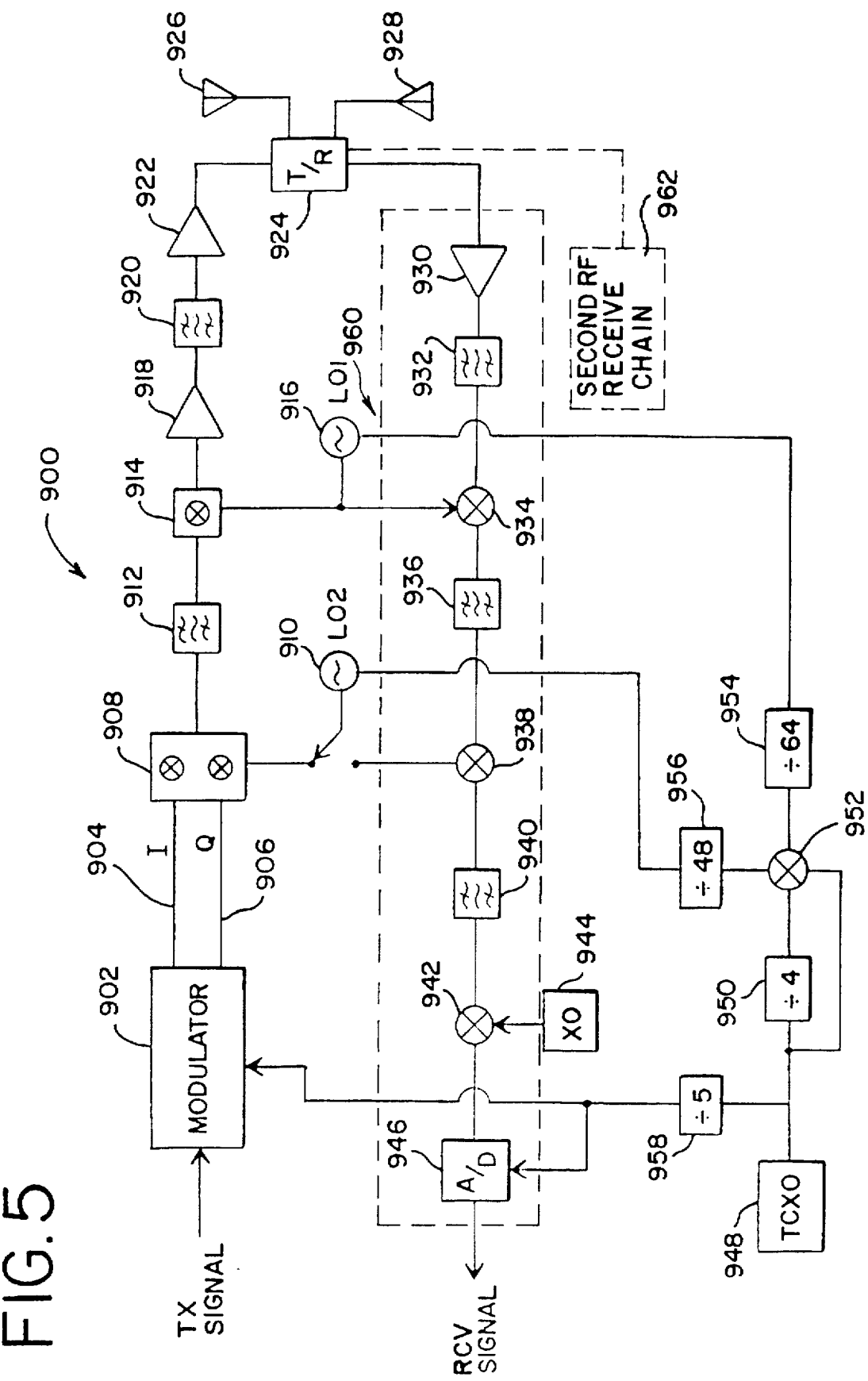
FIG. 5 is a block diagram of a preferred RF section for use in an SU.

FIG. 5 shows a block diagram of a preferred embodiment of an RF transmit and receive section 900 for a portable SU. On the transmit (Tx) signal side, the RF section 900 has a modulator 902 that modulates the outgoing digital signal into I 904 and Q 906 lines which connect to a pair of I,Q mixers 908. The pair of I,Q mixers 908 utilize the reference frequency from a second local oscillator (LO2) 910 to mix the I and Q transmit signals 904, 906 to a first intermediate frequency (IF) transmit signal preferably centered at 295.15 MHz for licensed band frequency transmissions. The first IF transmit signal is then filtered in a bandpass filter 912, preferably a discrete circuit of inductors and capacitors centered at 295.15 MHz, before being mixed again in a mixer 914.

The mixer 914 receives the first IF transmit signal and a mixing frequency from a first local oscillator (LO1) 916. The LO1 is preferably capable of producing frequencies in the range of 2.125 to 2.205 Ghz adjustable in 300 kHz steps. The first IF transmit signal is mixed to a higher frequency second IF transmit signal in the mixer 914 preferably in the range of 1.85 to 1.93 GHz. After mixing, the second IF is passed through a first gain stage 918, a bandpass filter 920 with a pass band of preferably 1.85 to 1.93 GHz, and a second gain stage 922. Once the signal passes through the second gain stage 922, it proceeds through a transmit/receive (T/R) switch 924 that connects the signal to an uplink antenna 926 for broadcast over the airwaves.

Received signals in the range of 1.91 to 1.99 GHz arrive at both the uplink antenna 926 and the downlink antenna 928. The T/R switch 924 connects one of the antennas to the receive portion of the RF section 900. The received signal is first amplified in a gain stage 930, such as a low noise amplifier to control the noise figure, and is then passed through a bandpass filter 932 with a pass band of 1.91 to 1.99 GHz to a mixer 934. The mixer 934 mixes the received signal with a reference frequency generated by LO 916 to create a first IF receive signal. A bandpass filter 936 centered at 215.15 MHz and connected to the mixer 934 filters the first IF receive signal.

The filtered first IF is then mixed in a second mixer 938 and downconverted to a second IF preferably centered at 10.7 MHz. Another bandpass filter 940 filters the second IF and connects to a third mixer 942. The third mixer 942 down converts the second IF to a third IF, preferably centered at 768 MHz by mixing the second IF against a reference frequency. In a preferred embodiment the reference frequency is a 9.932 MHz signal generated by a crystal oscillator. The third IF continues on to an analog-to-digital (A/D) converter 946 and the rest of the SU circuitry for timing measurements and recovery of the voice or data information.

The RF transmit and receive section 900 is based on a frequency scheme determined by the reference oscillator 948 which is preferably a temperature controlled crystal oscillator (TCXO) set at 15.36 MHz. The TCXO 948 signal is passed through a divide-by-four (÷4) circuit 950 and connected to a mixer 952. The mixer 952, in one embodiment, may be an image rejection mixer. The mixer 952 receives the divided TCXO 948 signal and a signal directly from the TCXO 948. The mixer 952 mixes these frequencies to a higher frequency, preferably 19.2 Mhz. The 19.2 MHz reference frequency branches off into two paths. One path connects to a divide-by-48 (÷48) circuit 956 and the other path connects to a divide-by-64 (÷64) circuit 954. The ÷64 954 signal, preferably a 300 kHz signal, is connected to LO2 916. The ≧48 circuit 956 preferably produces a 400 kHz signal and is connected to LO2 910. The TCXO signal also passes through a divide-by 5(÷5) circuit 958 for use by the A/D converter 946 as a 3.072 MHz reference. Other frequency schemes may be used and the TCXO signal may be used to create reference frequencies for the rest of the SU.

FIG. 5 also illustrates an alternative embodiment of the RF receive and transmit section 900. A second receive chain 962 may be included in an SU to maintain high voice and data quality in a high mobility environment as described above. The second receive chain 962 contains the same components as are in the first receive chain 960. Each of the receive chains 960, 962 are connected to one of the antennas 926, 928 through the T/R switch 924.

Referring again to FIG. 2, the central processing unit managing the processes in the SU 20 is preferably a digital signal processor (DSP) 49. A Texas Instruments TMS320C50 DSP chip is suitable. Other DSP chips, such as a TI TMS320C53 may also be used. The DSP 49 is used for both controls and performing the 32 kbps ADPCM speech encoding/decoding. In one embodiment, the DSP 49 operates as a 16-bit parallel load processor utilizing a 16-bit wide data bus 26. The DSP 49 is driven by a clock frequency received from the RF transmit 22 and receive 21 sections. Preferably the clock frequency is approximately 16 MHz (see FIG. 5 TCXO) but higher or lower frequencies may be used.

Another embodiment of the SU 20 includes an application specific integrated circuit (ASIC) for performing the control functions of cyclic redundancy checking, general synchronization of incoming and outgoing signals, digital phase-locked loop. In addition, the compression/decompression of the signals may be completed by the ASIC. Referring to FIG. 2, an ASIC may replace the channel decoder 35, channel encoder 44, digital correlator 37, and the DUART 65.

Two components in the SU 20 require the attention of the DSP 49. The DUART 65, which handles data flow, and the channel encoder/decoder 44, 35, which is preferably a single chip such as a Xilinx XC4005-6PQ208C, both generate interrupts to indicate that there is incoming data or that the component is ready for more data. The channel encoder/decoder 44, 35 generates two separate interrupts; one for encoding and one for decoding.

In standard WACS/PACS PCS, the SU 20 employs a time division multiple access (TDMA) method of communicating digital information to a radio port 50. As best seen in FIG. 6, the formatted information transmitted from the SU 20 to the RP 50 is arranged in eight time slot frames 60, each time slot 161 comprising 100 bits of information. The SU 20 broadcasts information onto one of the time slots 161 in radio transmission bursts to the RP 50. A particular RF frequency can carry one frame 60 of information. In a preferred embodiment the SU 20 can sweep in frequency for available time slots in a message 60.

Each 100 bit burst of information lasts approximately 250 microseconds and is synchronized such that the burst always corresponds with an appropriate time slot 161 that the SU 20 reserved for the particular transmission. Each time slot 161 of the transmitted message frame 60 carries information necessary to synchronize the SUs 20 transmission burst. Each TDMA burst from an SU 20 contains several information fields: guard band (GRD), slow channel (SC), fast channel (FC), cyclic redundancy check (CRC), and a reserved bit (RES).

The GRD and SC fields contain error information. The FC contains the speech or data transmitted from the SU 20 to the RP 50. The CRC information is computed at the SU 20 and used to compare against CRC data computed in the RP 50 for error detection or correction.

FIG. 7 depicts the standard formatted information received by an SU 20. An RP 50 transmits voice or data information to an SU in time division multiplex (TDM) format. TDM transmissions are continuous radio transmissions as opposed to the TDMA bursts. Again the SU 20 is allocated to a specific 100 bit time slot in a frame 70. The time slot 70 includes a synchronization pattern (SYC), a slow channel (SC), a fast channel (FC) containing the speech or data transmitted from the RP 50, a cyclic redundancy code (CRC), and power control channel (PCC) information.

The SYC and SC information comprise a 23 bit message that the SU 20 uses to synchronize with the RP 50. Synchronization and correlation are performed by the Xilinx chip.

The CRC represents data computed at the RPC 60 useful for determining errors in transmission.

The channel encoder 44, such as a XC4005-6PQ208C from Xilinx at 2100 Logic Drive, San Jose Calif. 95124-3400, preferably encodes a digital voice signal with the proper digital correlation information. The encoded signal is then modulated preferably using quadrature amplitude modulation (QAM) with a raised-cosine spectral shaping filter.

Figure 8:
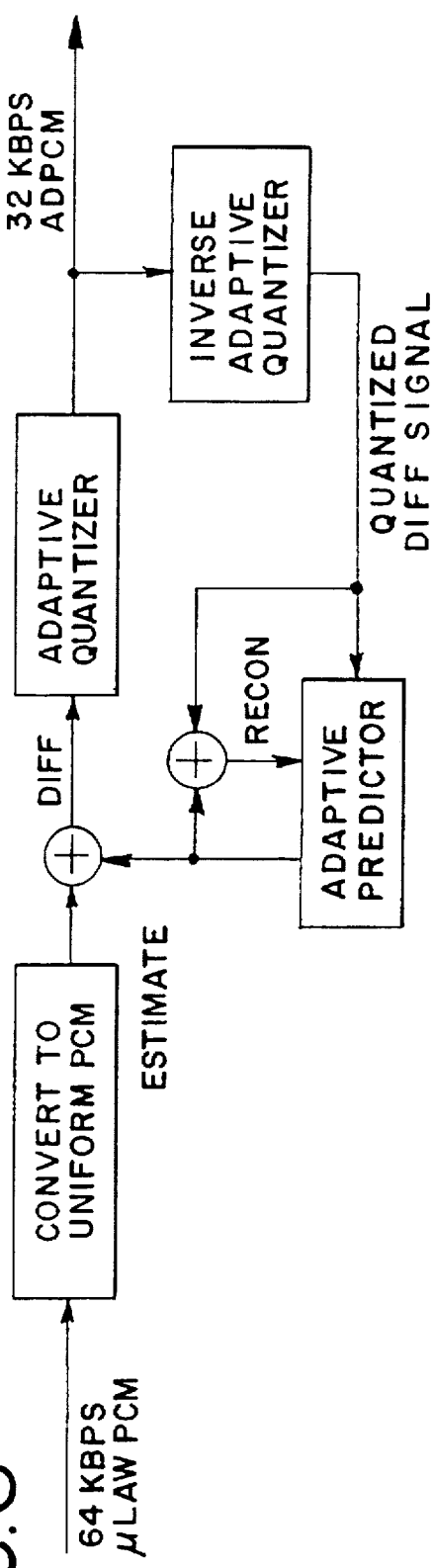
FIG. 8 is a functional block diagram of an encoder in the SU of FIG. 2.

As seen in FIG. 8, a preferred method of encoding voice data generated at the SU 20 is to take the 64 kbps mu-law PCM signal created at the PCM Codec 48 and encode the information into 32 kbps ADPCM. Preferably the DSP 49 performs the encoding. The encoding is based on the CCITT Recommendation G.721 standard algorithm. The encoding process begins by converting the mu-law PCM to uniform PCM. After conversion to uniform PCM, a difference signal is obtained by subtracting an estimate of the input signal from the input signal itself. An adaptive quantizer is used to assign four bits to the value of the difference signal per sample. An inverse quantizer produces a quantized difference signal from these four bits. The signal estimate is added to this quantized difference signal to produce the reconstructed version of the input signal. Both the reconstructed signal and the quantized difference signal are operated on by an adaptive predictor which produces the estimate of the input signal, thereby completing the feedback loop.

Figure 9:
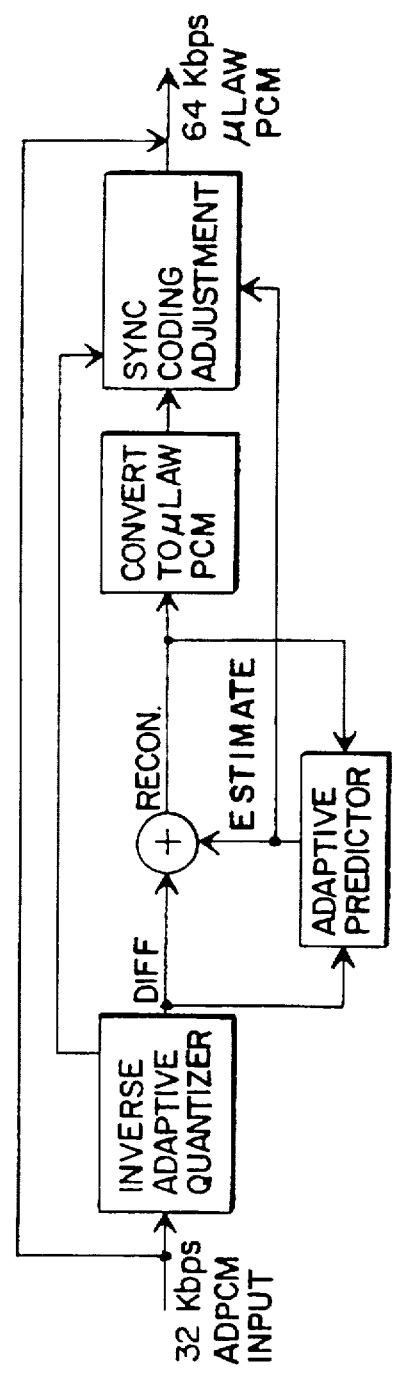
FIG. 9 is a functional block diagram of a decoder in the SU of FIG. 2.

Voice signals received on the antennas 29, 30 (FIG. 2) are 32 kbps ADPCM signals modulated on RF frequencies. The signals must be demodulated, converted to 64 kbps mu-law PCM in the DSP, and sent to the PCM Codec 48 for conversion into analog signals. The decoding, as illustrated in the functional block diagram of FIG. 9, is performed in a functional structure similar to the feedback portion of the encoder algorithm together with a uniform PCM to mu-law PCM conversion and a synchronous coding adjustment. The adjustment prevents cumulative distortion on synchronous tandem codings.

Although voice signals will not typically require greater than the 32 kbps bandwidth available in a TDMA timeslot, data transmissions may require greater bandwidth capabilities. Referring again to FIG. 5, the eight time slots accessible by an SU each may handle a 32 kbps ADPCM signal. The ADPCM format, although reliable when used to compress voice information, only allows data to be reliably transmitted at 9.6 kbps.

Figure 10:
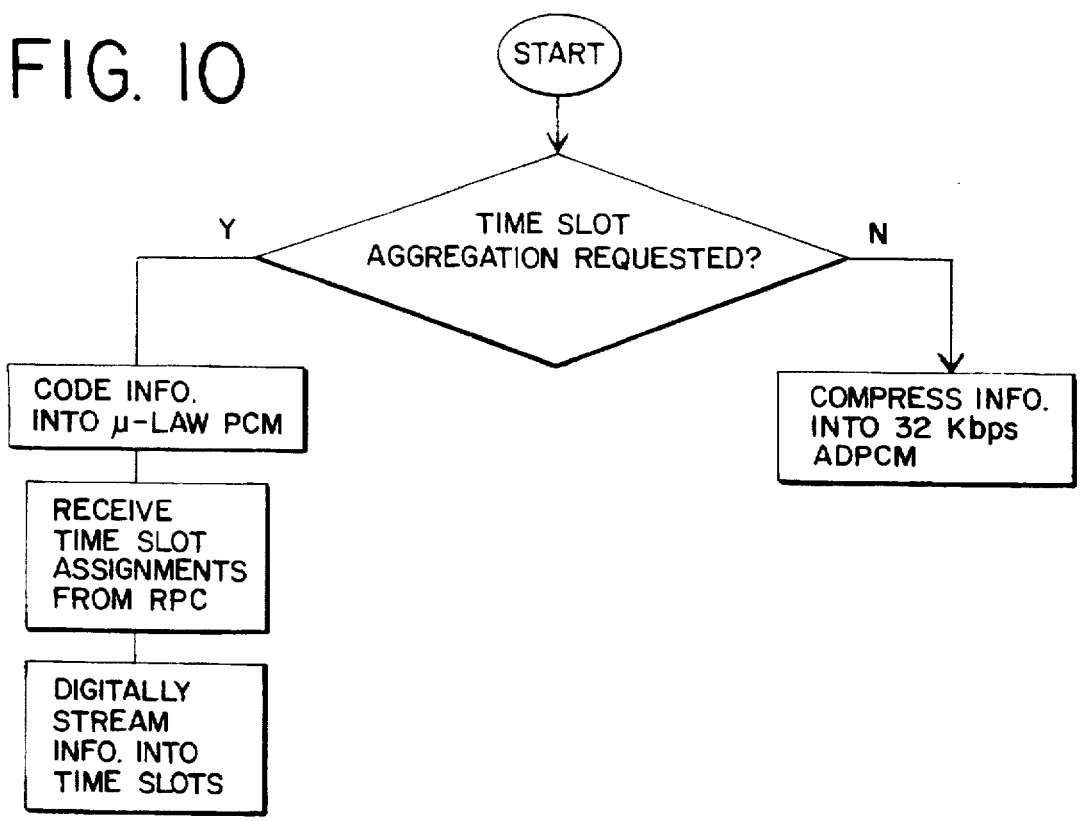
FIG. 10 is a flow chart illustrating a method of handling high data rate transmissions using the SU of FIG. 2.

FIG. 10 illustrates a preferred method of managing high bandwidth data requirements at the SU. A user first requests a higher than 32 kbps time slot. The SU then forwards the request via a message, preferably in the Request Channel, to the RP. The RP passes this request on to the RPC which will then assign the appropriate number of time slots based on the data rate requirement requested in the message. The SU will then encode the data in μ-law or A-law PCM. Finally, the SU performs a digital streaming step that breaks up the data into the assigned time slots.

The time slots aggregated for higher data transport do not need to be contiguous. For instance, referring again to FIG. 5, contiguous slots 1 and 2 may carry a 64 kbps signal as effectively as discontiguous slots 1 and 4. By aggregating two time slots, whether contiguous or not, a user has access to a 64 kbps data path that will accept PCM coding that is a more reliable data transport.

Additionally, higher than 64 kbps data rate requirements may be met using the method described above. Standard ISDN-BRI format data may also be accommodated using the present method. ISDN information typically comprises 2 "B" channels of 64 kbps each and 1 "D" channel of 16 kbps for a total of 144 kbps. At 32 kbps per time slot, an ISDN signal requires 5 time slots. The presently preferred method may handle up to 256 kbps per RF channel.

In another preferred embodiment, the SU 20 includes a delayed deregistration feature and standby mode. The delayed deregistration feature operates to keep an SU 20 registered on a WACS/PACS PCS system for a period after the SU 20 terminates a communication (i.e., hangs up). This feature helps to avoid problems associated with inadvertent disconnections and helps to speed up system access to the system for consecutive telephone/data calls.

Figure 11:
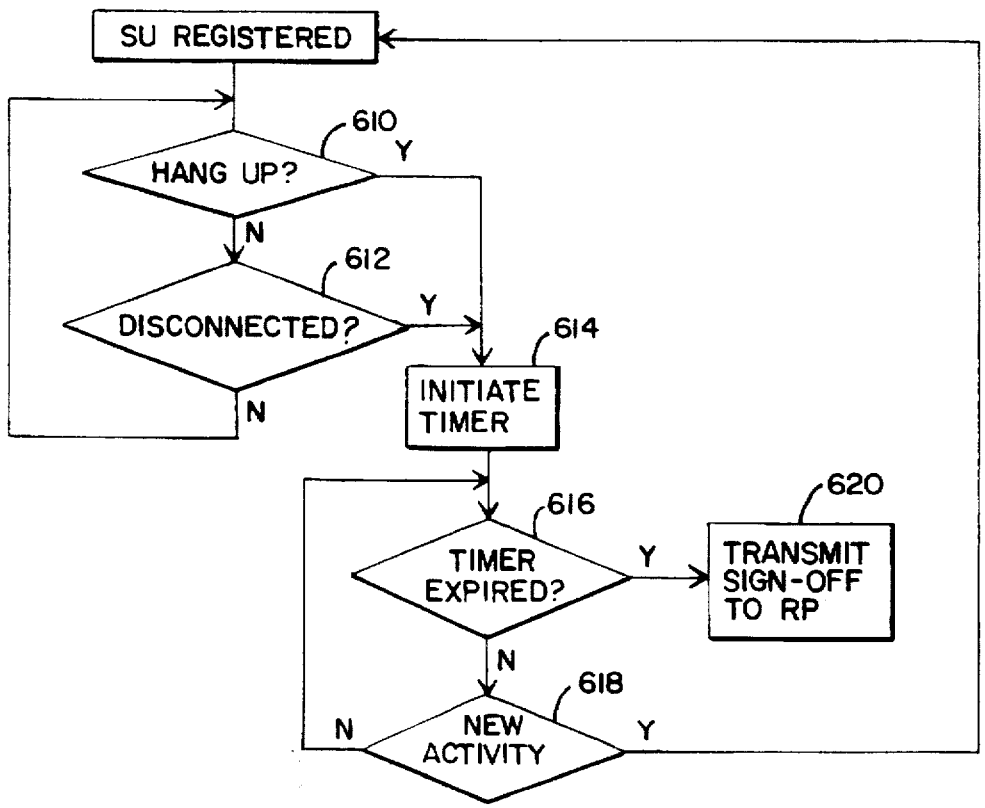
FIG. 11 is a flow chart illustrating a method of maintaining SU registration in a PCS system.

Referring to FIG. 11, one embodiment of this feature includes a timer built in to the SU 20 to keep the SU registered with the system for a predetermined period of time after a disconnection, planned or inadvertent. The method begins with the step of monitoring to see if the user has hung up 610. If the user has hung up, a timer is initiated 614. The timer counts down a predetermined period of time that may be adjusted at the system level. The SU, if no hang up is detected, also checks to see if the communication has been disconnected 612. Again, the timer is initiated if a disconnect is detected. Once the timer begins, the SU checks to see if the timer has expired 616. While the timer has not expired, the SU continues to monitor for activity 618, such as the initiation of a new call. New activity will stop the timer, leave the SU registered, and begin the cycle again. If the timer expires, the SU transmits a sign-off signal 620 to an RP for relay to a RPC.

As best shown in FIG. 12, another embodiment of this method is to control the SU power down from a timer located in the RPC that will keep the SU registered for a predetermined period of time. As described above, the SU monitors for both a hang up 622 or a disconnection 624. If either is detected, the SU immediately transmits a sign-off 626 signal to an RP for relay to an RPC. The RPC monitors to see if a sign-off signal has been sent 632. A timer at the RPC is initiated 634 when a sign-off signal arrives. During the timer countdown, the RPC checks to see if the timer has expired 636 and also monitors to see if the SU has sent a sign-off cancellation message 640. If the timer expires before any sign-off cancellation is received, the RPC de-registers the SU 638. Alternatively, if a sign-off cancellation does arrive in time, the RPC maintains the SU registration 642.

Additional advantages and modifications will readily occur to those skilled in the art. The invention, in its broader aspects, is therefore not limited to the specific details, representative apparatus, and illustrative examples shown and described. Various modifications and variation can be made to the present invention without varying from the scope or spirit of the invention, and it is intended that the present invention cover the modifications and variations provided they come within the scope of the appended claims and their equivalents.

What is claimed is:

1. A subscriber unit for receiving and transmitting digital information in a wireless communication system, said subscriber unit comprising:

a plurality of antennas;

an RF receive section including a diversity selection unit for receiving input signals from each of the antennas;

an RF transmit section for generating an output signal to be transmitted over at least one of the antennas;

means for modemlessly coupling digital signals between a first external processing device, the RF receive section, and the RF transmit section such that the subscriber unit is adapted to communicate data between the first external processing device and a second external processing device;

a circuit for downconverting radio frequency signals, the circuit including (a) a first mixer connected to a first local oscillator for producing an adjustable first local oscillator frequency; (b) a second mixer connected to a second local oscillator centered at a predetermined second local oscillator frequency; and (c) a third mixer connected to a third local oscillator centered at a predetermined third local oscillator frequency; and a databus interconnecting said RF receive section, said RF transmit section, and said modemless coupling means.

2. The subscriber unit of claim 1 further comprising:

an analog port adapted for connection to an analog telephone, said analog port being in communication with said databus.

3. The subscriber unit of claim 2, wherein said analog port includes a digital signal processor.

4. The subscriber unit of claim 1, wherein said plurality of antennas are positioned spatially and angularly diverse from each other.

5. The subscriber unit of claim 1, wherein said subscriber unit is a portable subscriber unit.

6. The subscriber unit of claim 5, wherein the portable subscriber unit comprises more than one receive chain, at least one of said receive chains assigned to search for frequencies having a predetermined signal-to noise ratio, and at least one of said receive chains communicating with a radio port thereby providing improved high mobility performance.

7. The subscriber unit of claim 1, wherein the first local oscillator frequency is adjustable in the range of approximately 2.125 to 2.205 Ghz.

8. The subscriber unit of claim 1, wherein the second local oscillator frequency is approximately 225.85 MHz.

9. The subscriber unit of claim 1, wherein the third local oscillator frequency is approximately 9.932 Mhz.

10. The subscriber unit of claim 1, wherein the modemless coupling means comprises a digital data port.

11. The subscriber unit of claim 10, wherein the digital dataport comprises an RS-232 port and a DUART.

12. A subscriber unit for receiving and transmitting digital information in a wireless communication system, said subscriber unit comprising:

a plurality of antennas;

an RF receive section including a diversity selection unit for receiving input signals from each of the antennas;

an RF transmit section for generating an output signal to be transmitted over at least one of the antennas;

a digital dataport;

a circuit for downconverting radio frequency signals, the circuit including (a) a first mixer connected to a first local oscillator for producing an adjustable first local oscillator frequency; (b) a second mixer connected to a second local oscillator centered at a predetermined second local oscillator frequency; and (c) a third mixer connected to a third local oscillator centered at a predetermined third local oscillator frequency; and a databus interconnecting said RF receive section, said RF transmit section, and said digital dataport.

13. The subscriber unit of claim 12, wherein the first local oscillator frequency is adjustable in the range of approximately 2.125 to 2.205 GHz.

14. The subscriber unit of claim 12, wherein the second local oscillator frequency is approximately 225.85 MHz.

15. The subscriber unit of claim 12, wherein the third local oscillator frequency is approximately 9.932 Mhz.

* * * * *